C. E. L. Holmes.
Drying Sheet Iron.
No. 3,678. Reissued Oct. 19, 1869.
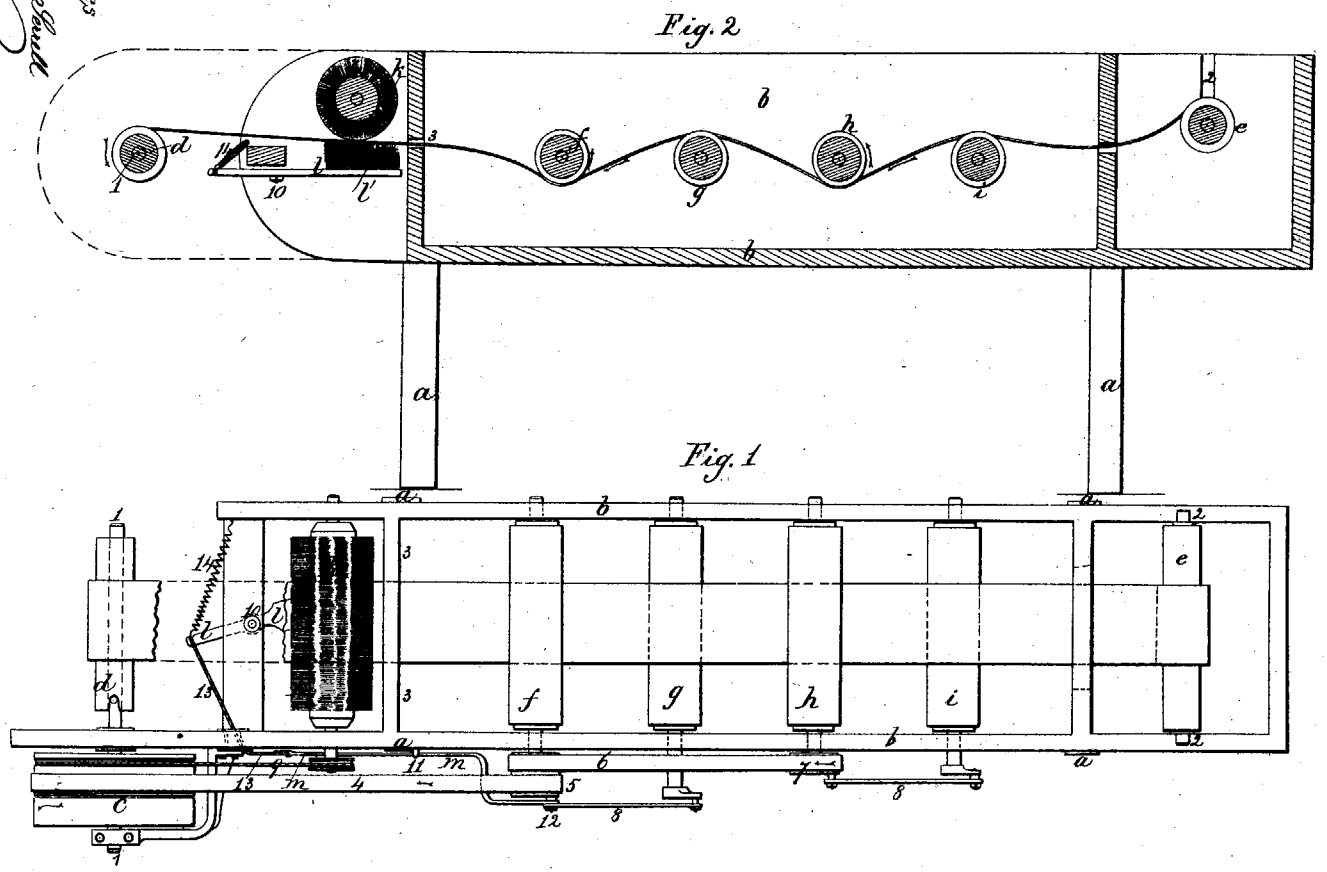
Witnesses
Samuel W. Serell
Wm. Renville
Inventor
C. E. L. Holmes
N. PETERS, PHOTO-LITHOGRAPHER, WASHINGTON, D. C.

UNITED STATES PATENT OFFICE.

CHARLES E. L. HOLMES, OF NEW YORK, N. Y.

IMPROVED MACHINE FOR DRYING AND SCOURING SHEET METAL.

Specification forming part of Letters Patent No. 80,179, dated July 21, 1868; Reissue No. 3,678, dated October 19, 1869.

*To all whom it may concern:*

Be it known that I, CHARLES E. L. HOLMES, of the city and State of New York, (formerly of Waterbury, in the State of Connecticut,) have invented, made, and applied to use certain new and useful Improvements in Means for Scouring and Drying Out Sheet Metal; and I do hereby declare that the following is a full, clear, and exact description of the construction and operation of the same, reference being had to the annexed drawings, making part of this specification, wherein—

Figure 1 is a plan, and Fig. 2 a vertical section, of the apparatus used by me.

Similar marks of reference indicate the same parts in all the figures.

Sheet metal, and particularly sheet-brass, in the process of finishing has to be scoured or ground upon its surfaces in order to remove the scales or other inequalities which accumulate on the surface in the course of manufacture, and after the sheet has been rolled for the last time, annealed, and scoured it has to be immersed in acid to cleanse the surface, then washed in water, after which the sheets have to be dried. Heretofore such sheets have been scoured with sand and passed through fine sawdust, and wiped off with a cloth by hand, which was a slow and expensive, as well as imperfect, method of scouring and drying such sheets.

In order to overcome the difficulties, imperfections, and expense in scouring and drying sheet metals in the manner heretofore practiced and do the work in a machine instead of by hand is the object of this invention. I make use of a series of moving rollers arranged to act upon the surface of the sheet metal to scour or wipe the same, and I employ a receptacle for the sawdust, sand, or other material employed in the operation.

In the drawings, *a a* are the legs supporting a box or frame, *b*, at one end of which is a pulley or drum, *c*, receiving motion from any convenient power to drive the machine.

*d* is a roller, slipped onto the shaft 1 of the pulley *c*, and fitted with a key or slot, by which the said roller is prevented from turning independent of the shaft, but allowing the roller to be slipped off the shaft with the sheet-brass that is wound upon it during the operation of the machine, and the sheet metal may then be removed from the roller.

*e* is a roller, around which the sheet metal to be scoured or dried is wound, and its journals revolve in the grooves 2 2 in box *b*. The sheet of metal is passed through an aperture in the end of box *b*, over rubber *i*, under roller *h*, over rubber *g*, and under roller *f*, in a serpentine course, presenting the surface of the sheet metal in a curved form upon the scouring rollers and rubbers, and then passes out through an opening, 3, in box *b*, between revolving and reciprocating brushes *k* and *l'*, and is wound upon roller *d*.

4 is a band from pulley *c*, giving motion to pulley 5 on the shaft of roller *f*, giving the shaft a continuous rotary motion. From pulley 5 is another band, 6, to a pulley, 7, on the shaft of roller *h*, revolving it in the same direction as roller *f*. Short connecting-rods 8 are used to give a vibrating motion to rollers or rubbers *g i*, which vibratory motion is due to and by reason of the crank-pins on the pulleys *f* and *h* not being coincident with the pins on pulleys *g* and *i*.

9 is a band from pulley *c*, turning a revolving brush, *k*, set in bearings in box *b*, and acting to brush off the dust from the top of the sheet after being scoured and dried.

*l'* is brush on lever *l*, pivoted at 10, receiving motion from lever *m* on pivot 11, and 12 is a pin acting on lever *m*. The cord 13 acts to pull lever *l* over to one side, and spring 14 compels it to reciprocate back to the opposite side and under the surface of the sheet metal, thereby brushing off all dirt or dust adhering to the under side of the sheet of metal, and the sheet thus scoured, cleaned, and dried passes onto roller *d*, and is wound into convenient rolls for use or transportation.

In using this machine for scouring metal sheets, sand is used in a wet state, and supplied to the sheets and rollers and rubbers, which act on both sides of the sheets as they pass through the machine and in contact with the rollers and rubbers, as before stated. When used for drying sheet metal, the box *b* is filled with fine saw-dust, covering the rollers and sheet metal, and as the sheet passes through the machine thus provided the sawdust absorbs the moisture on the metal and covering of the rollers and rubbers.

The sheets of metal in passing through the machine, whether for scouring or drying, should travel in the opposite direction to the motion given the rollers *f* and *h*; but it is evident that they might be made to pass under instead of over the rollers *g* and *i*, in which case the rollers *f* and *h* would turn in the same direction that the sheets of metal travel and at greater speed.

It is evident that the brushes might be changed with relation to each other and the metal sheet without changing the invention.

I am aware that sheet metal plates have been ground or polished by passing the sheets between revolving grinding-cylinders and giving the sheets a motion contrary to the direction of the revolution of the cylinders by forcing or drawing through between and against the direction of motion of the cylinders which grind the surfaces of the metal. Such is not my invention.

In my machine the parts are so arranged as to pass the sheet metal alternately above and below the scowing rollers or rubbers, whereby a more perfect operation is obtained, because the bending of the sheet to thus pass over and under the rollers staightens out any irregularity in said sheet caused in rolling or annealing, and allows the rollers or rubbers to act uniformly on the surface of the sheet in its curved position; otherwise if the sheets were passed through in a straight direction the warped and twisted condition of the sheet would prevent a uniform and complete action upon all the surface of the sheet and the curving of the metal over the rollers causes a greater surface of the metal to be in contact with the rollers and rubbers than there would be if the direction of the sheet were straight when between the rollers and rubbers.

What I claim, and desire to secure by Letters Patent, is—

1. A series of moving rollers arranged to act successively upon the surface of a sheet of metal and scour or wipe the surface of the same while being passed through the machine, substantially as set forth.

2. A series of moving rollers arranged to act upon the surface of a sheet of metal and scour or wipe the surface of the same, in combination with an inclosing box or case for retaining sawdust or other fine particles of material for operating on the sheet metal, substantially as set forth.

3. In a machine for scouring or drying sheet metal, arranging the rollers or parts that operate upon the sheet metal in substantially the manner specified, so that the sheet metal shall be in a curved position while being acted upon, substantially as and for the purposes specified.

4. A winding-up roller, in combination with the scouring or drying mechanism, substantially as specified, whereby the sheet metal can be drawn through the apparatus, wound up, and then removed with facility, substantially as set forth.

In witness whereof I have hereunto set my signature this 14th day of November, A. D. 1868.

CHAS. E. L. HOLMES.

Witnesses:
GEO. D. WALKER,
CHAS. H. SMITH.